United States Patent
Tabata et al.

(10) Patent No.: US 7,993,934 B2
(45) Date of Patent: Aug. 9, 2011

(54) REACTION METHOD USING A MICROREACTOR, AND A MICROREACTOR

(75) Inventors: Kazuaki Tabata, Kanagawa (JP); Masaki Hirota, Kanagawa (JP); Takayuki Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 328 days.

(21) Appl. No.: 12/194,997

(22) Filed: Aug. 20, 2008

(65) Prior Publication Data
US 2009/0107030 A1 Apr. 30, 2009

(30) Foreign Application Priority Data
Oct. 30, 2007 (JP) ................................. 2007-282104

(51) Int. Cl.
*G01N 1/00* (2006.01)
*B01J 10/00* (2006.01)

(52) U.S. Cl. ............ 436/174; 436/43; 422/129; 422/50; 422/81; 422/82; 422/100

(58) Field of Classification Search .................. 422/129, 422/68.1, 50.81, 82, 100; 436/43, 174
See application file for complete search history.

(56) References Cited

U.S. PATENT DOCUMENTS

| | | | | |
|---|---|---|---|---|
| 2,705,594 A | * | 4/1955 | Brewer | 494/22 |
| 3,190,229 A | * | 6/1965 | Turowski | 417/412 |
| 3,854,176 A | * | 12/1974 | Kendall et al. | 422/159 |
| 6,007,775 A | * | 12/1999 | Yager | 422/57 |
| 6,306,305 B1 | * | 10/2001 | Harper | 210/634 |
| 6,974,926 B2 | * | 12/2005 | Zhang et al. | 209/129 |
| 7,402,131 B2 | * | 7/2008 | Mueth et al. | 494/36 |
| 2004/0213083 A1 | * | 10/2004 | Fujiwara et al. | 366/336 |
| 2005/0123450 A1 | * | 6/2005 | Gilbert et al. | 422/81 |
| 2008/0017246 A1 | * | 1/2008 | Tabata et al. | 137/3 |
| 2008/0240987 A1 | * | 10/2008 | Yamada et al. | 422/68.1 |

FOREIGN PATENT DOCUMENTS

| | | |
|---|---|---|
| JP | A-2001-090151 | 4/2001 |
| JP | A-2004-317439 | 11/2004 |
| JP | A-2005-077219 | 3/2005 |

OTHER PUBLICATIONS

A.J. deMello, "Control and detection of chemical reactions in microfluidic systems," Nature, vol. 442, Jul. 27, 2006, pp. 394-402.*
Ismagilov et al., "Pressure-Driven Laminar Flow in Tangential Microchannels: an Elastomeric Microfluidic Switch," Anal. Chem., vol. 73, No. 19, Oct. 1, 2001, pp. 4682-4687.*

* cited by examiner

*Primary Examiner* — Brian J Sines
(74) *Attorney, Agent, or Firm* — Oliff & Berridge, PLC

(57) ABSTRACT

A reaction method using a microreactor, comprises: forming, in a microchannel, an at least two-layered laminar flow in n kinds (n is an integer of 3 or more) of a fluid 1, a fluid 2, ..., and a fluid n at least two kinds of which are mutually incompatible; and pulsating at least one kind of the fluids.

16 Claims, 7 Drawing Sheets

REACTION METHOD USING A MICROREACTOR, AND A MICROREACTOR

CROSS-REFERENCE TO RELATED APPLICATIONS

This application is based on and claims priority under 35 USC 119 from Japanese Patent Application No. 2007-282104 filed Oct. 30, 2007.

BACKGROUND (i) Technical Field

The present invention relates to a reaction method using a microreactor, and a microreactor.

(ii) Background Art

Recently, the development of a new manufacturing process using a micro vessel called a micromixer or a microreactor has been underway in the chemical industry and the pharmaceutical industry relating to the manufacture of medicines, reagents, etc. A microchannel connecting to a plurality of microchannels (fluid inlet channels) is provided in the micromixer or the microreactor. As a plurality of fluids (e.g., solutions in which reaction materials are dissolved) are converged into the microchannel, the plurality of fluids are mixed in the microchannel, or a chemical reaction is caused in conjunction with mixing. Micromixers and microreactors are common in terms of their basic structures. In some particular cases, however, those in which a plurality of fluids are mixed with each other are referred to as "micromixers," while those in which the mixing of a plurality of solutions is accompanied by a chemical reaction are referred to as microreactors.

In the microreactor, devices and reaction mechanisms are miniaturized as compared with conventional systems. Therefore, to subject a plurality of fluids to chemical reaction efficiently in a microchannel, development and research are conducted to increase the reaction surface area per unit volume of a specimen. By increasing the reaction surface area per unit volume of the specimen, it is possible to substantially reduce the reaction time and the amounts of specimens and reagents required for reaction and analysis.

SUMMARY

According to an aspect of the invention, there is provided a reaction method using a microreactor, comprising: forming, in a microchannel, an at least two-layered laminar flow in n kinds (n is an integer of 3 or more) of a fluid 1, a fluid 2, . . . , and a fluid n at least two kinds of which are mutually incompatible; and pulsating at least one kind of the fluid.

BRIEF DESCRIPTION OF THE DRAWINGS

Exemplary embodiments of the present invention will be described in detail based on the following figure, wherein.

DETAILED DESCRIPTION

Figure 1:
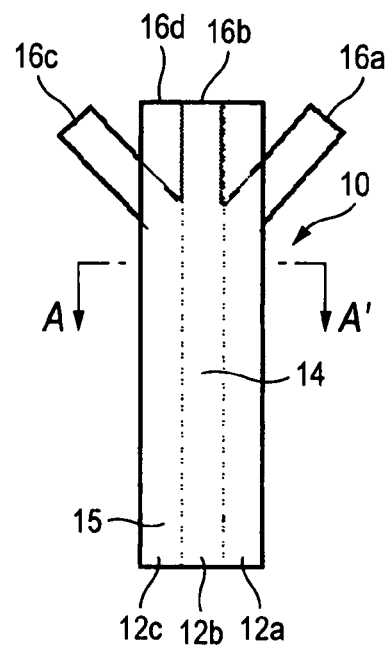
FIG. 1 is a plan view taken from an upper surface side of a microreactor in which n=4, and which is used as an exemplary embodiment of the invention.

The reaction method using a microreactor (hereafter also simply referred to as the "reaction method") is characterized by comprising: a step of forming within a microchannel an at least two-layered laminar flow in n kinds (n is an integer of 3 or more) of a fluid 1, a fluid 2, . . . , and a fluid n at least two kinds of which are mutually incompatible; and a pulsation step of pulsating at least one kind of the fluid. Hereafter, a detailed description will be given of the reaction method in accordance with the invention.

<Microchannel>

In the invention, the microchannel refers to a channel whose channel diameter is 5,000 μm or less. It should be noted that the channel diameter is a circular equivalent diameter (diameter) which is determined from the cross-sectional area of the channel.

In the invention, a microreactor having a microchannel with a width of several micrometers to 5,000 micrometers is preferably used. The channel width of the microchannel of the microreactor is preferably 50 μm to 1,000 μm, more preferably 50 to 500 μm. The microreactor used in the invention is a reactor having one or more channels of a micro scale. The channel of the microreactor is preferably designed such that the Reynolds number becomes 2,300 or less. In this case, the microreactor having the microchannel becomes not a turbulent flow-dominant device as in a regular reactor but a laminar flow-dominant device.

Here, the Reynolds number (Re) is defined by the following formula, the laminar flow is dominant when the Reynolds number is 2,300 or less.

$$Re = uL/v$$

(u: velocity of flow, L: representative length, v: coefficient of kinetic viscosity)

It should be noted that the cross-sectional shape of the microchannel is not particularly limited, and can be appropriately selected from among a circular shape, an elliptical shape, a rectangular shaper a potbellied shape, and the like depending on the objective. Among these, the cross-sectional shape of the microchannel is preferably a circular shape or a rectangular shape, and the rectangular shape is even more preferable. From the perspective of the manufacture of the microreactor device, the microchannel should preferably be rectangular or square in its cross-sectional shape.

<Step of Forming a Laminar Flow>

The reaction method in accordance with the invention includes the step of forming within a microchannel an at least two-layered laminar flow in n kinds (n is an integer of 3 or more) of a fluid 1, a fluid 2, . . . , and a fluid n at least two kinds of which are mutually incompatible.

In the microchannel, the n kinds of fluids, at least two kinds of which are mutually incompatible, form an at least two-layered laminar flow, preferably an n-layered laminar flow. Here, n is an integer of 3 or more, preferably 3 to 10, more preferably 3 to 8.

In addition, the n kinds of fluids are preferably n kinds of liquids.

The fact that at least two kinds of fluids, preferably two kinds of liquids, are mutually incompatible means that these at least two kinds of liquids are immiscible with each other (have immiscibility) at a working temperature of the microreactor, preferably at 25° C. Specifically, it is possible to adopt as mutually incompatible liquids such a combination of liquids that when two kinds of liquids subject to inspection are mixed in a test tube at 25° C., the liquids are phase-separated from each other. As such combinations of mutually incompatible liquids, it is possible to cite 1,2-dichlorobenzene and silicone oil, in addition to water and white gasoline, water and benzene, and water and toluene.

In order for the liquids to be immiscible, it is preferred that the liquids assume such a relationship as that between water and oil. As hydrophilic fluids which are typified by water, it is possible to cite ethanol, acetic acid, and ethylene glycol. As hydrophobic fluids which are typified by oil, it is possible to cite white gasoline, benzene, toluene, nitrobenzene, aniline, methyl nitrate, and carbon disulfide. Whether or not specific two kinds of fluids are immiscible are determined in accordance with the above-described test as to whether or not the fluids are phase-separated.

In order for the liquids to be of such two kinds of mutually incompatible liquids, it is important that there be a difference in solubility parameters.

TABLE 1

| Fluid (Liquid) | Property | Specific Gravity |
| --- | --- | --- |
| Aqueous solution | hydrophilic | Approx. 1.0 |
| 1,2-dichlorobenzene | lipophilic | 1.30 |
| White gasoline | lipophilic | 0.65 |
| Toluene | lipophilic | 0.87 |
| Benzene | lipophilic | 0.88 |
| Nitrobenzene | lipophilic | 1.22 |
| Silicone oil | lipophilic | 0.97 |
| Aniline | lipophilic | 1.01 |
| Methyl nitrate | lipophilic | 1.22 |
| Carbon disulfide | lipophilic | 1.26 |
| Tetrabromoethane | lipophilic | 2.97 |
| Ethanol | hydrophilic | 0.79 |
| Acetic acid | hydrophilic | 1.06 |
| Ethylene glycol | hydrophilic | 1.11 |

If n equals 3, at least two kinds, the fluid 1 and the fluid 3, are mutually incompatible, and the fluid 1 and the fluid 2 are mutually compatible and reactive, so that a reactive method is preferably adopted. Thus, of the fluid 1 to the fluid n, at least two kinds of fluids should preferably be mutually compatible and reactive.

The two kinds of mutually compatible fluids should preferably form a laminar flow in which they are in contact with each other, and the fluid which is incompatible with these two fluids should preferably form a laminar flow in which that incompatible fluid is in contact with the at least two kinds of reactive fluids.

In addition, in order for the n kinds of fluids flowing through the microchannel to exhibit a desired effect of the invention, the n kinds of fluids should preferably have mutually close values of fluid densities. In a case where the density difference between the liquids used is large, it is preferred that a light liquid be caused to flow on the upper side, and that a heavy liquid be caused to flow on the lower side.

<Pulsation Step>

In addition, the reaction method in accordance with the invention includes a pulsation step of causing the velocity of flow of at least one kind of the fluid among the n kinds of fluids to pulsate in a longitudinal direction of the channel. Here, the term "pulsation" means the liquid flow in which the flow rate oscillates over time. The pulsation should preferably oscillate periodically, more preferably oscillate both periodically and continually, and particularly preferably oscillate sinusoidally. In addition, the pulsation of the fluid is preferably the pulsation of a liquid rather than the pulsation of a gas.

The frequency of pulsation is preferably an ultra low frequency and is preferably 1 Hz or more and less than 1 kHz.

The chemical reaction between the plurality of fluids, which flow in contiguity to each other and form a laminar flow field within the microchannel, progresses through molecular diffusion in an interface region of the laminar flow. By virtue of the presence of at least one kind of laminarly flowing fluid which formed pulsation in the microchannel without being blended with these fluids but in contact therewith, the pulsating fluid is able to expand the contact surface area of the reactive fluids and efficiently promote the chemical reaction between the reactive fluids without elongating the microchannel.

In addition, the at least one kind of the fluid which formed the pulsation has a contact interface with the reactive fluids within the microchannel and also has a contact interface with a microchannel wall. For this reason, the reactive fluids have narrow areas of contact with microchannel walls, and their pressure loss based on contact with the microchannel walls becomes small, with the result that the pressure loss of the microreactor as a whole becomes small. In addition, the problem of clogging due to contact with the microchannel walls can also be either reduced or overcome.

As the pulsation step, it is preferable to use at least one of (1) a step of pulsating the flow rate of the fluid which is supplied by a syringe pump, (2) a step of pulsating an elastic tube by a vibrator, and (3) a step of causing pulsation on the basis of an interfacial tension difference between the fluid microchannel wall and the fluid, each of these steps being performed at a fluid inlet port of the microchannel. Each of these will be described below.

The pulsation step included in the reaction method of the invention can be exemplified by (1) a step of pulsating the flow rate of the fluid supplied by a syringe pump. This step is preferably a step of pulsating the flow rate of the fluid supplied by a syringe pump connected to the fluid inlet port of the microchannel through an inelastic tube, as required.

In the above-described step, the frequency of pulsation is preferably an ultra low frequency and is preferably 1 Hz or more and less than 1 kHz.

In the pulsation step of pulsating at least one kind of the fluid, it is possible to use a syringe pump including a cylinder connected to the microchannel; a plunger which reciprocates within the cylinder and pulsate the flow rate of the fluid by the reciprocating motion to thereby pressure feed the fluid downstream of the cylinder; an electromagnetic solenoid for reciprocating the plunger; and a controlling means for controlling the excitation of the electromagnetic solenoid. The plunger can be reciprocated within the cylinder through the excitation control of the electromagnetic solenoid, and the fluid can be thereby pressure fed in a state in which the flow rate of the fluid is pulsated. The syringe pump may be directly connected to the microchannel or may be connected to the fluid inlet port of the microchannel through an inelastic tube, as required.

The controlling means is capable of providing excitation control by controlling the duty ratio ($\tau/T$) of the electromagnetic solenoid. Through control of the duty ratio of the electromagnetic solenoid, the flow of the fluid which oscillates periodically and continually can be introduced into the microchannel. In addition, in changing the aforementioned duty ratio ($\tau/T$) of the electromagnetic solenoid, it is also possible to artificially create an arbitrary pulsation waveform by making use of PWM (pulse width modulation).

It should be noted that the means disclosed in JP-A-2001-90151 can be referred to as the means for controlling the duty ratio of the electromagnetic solenoid.

In addition, the pulsation step included in the reaction method of the invention can also be exemplified by (2) a step of pulsating an elastic tube by a vibrator and of transmitting this vibration to the fluid inside the microchannel.

In addition, the pulsation step may also be a step of pulsating the fluid by a device which periodically compresses an elastic tube connecting the fluid inlet port of the microchannel and a constant-velocity fluid feeder. As the material of the elastic tube, it is possible to cite various synthetic rubbers, and silicone rubber is preferable.

In these steps, the frequency for causing pulsation is preferably an ultra low frequency and is preferably 1 Hz or more and less than 1 kHz.

A specific process of pulsating the elastic tube may comprise a pair of supporting members for supporting the elastic tube at a predetermined interval in the longitudinal direction of the elastic tube; a vibrating beam of a cantilevered structure provided between the pair of supporting members to support the elastic tube in its hollow portion; and a vibrator mounted on a leading end portion of the vibrating beam and having an eccentric weight attached to a motor shaft of a compact motor. The compact motor is vibrated integrally with the vibrating beam by rotating the eccentric weight by the vibrator, to thereby impart mechanical vibrations to the elastic tube supported by the vibrating beam. As the elastic tube is thus pulsated, the fluid flowing within the elastic tube can be sent in a pulsated state.

The aforementioned vibrator is not particularly limited insofar as it is a vibrator which is capable of generating low-frequency vibrations capable of producing predetermined low-frequency vibrations in the fluid flowing through the microchannel. For example, a vibrator such as an electromagnetic vibrator capable of on/off operation at a constant frequency is preferable. In addition, since the vibrator is mounted on the microchannel, the vibrator is preferably a compact and low-power consuming device in which the vibrator for rotating the eccentric weight and the vibrating beam integrally vibrate to pulsate the elastic tube.

The frequency of the vibrator is not particularly limited insofar as it is a low frequency, and is preferably not less than 1 Hz and less than 1,000 Hz, more preferably 1 to 60 Hz. If the frequency is within the aforementioned range of numerical values, the vibrator and the vibrating beam can be integrally vibrated to oscillate the elastic tube in a pulsed state, which is therefore favorable.

In addition, the pulsation step included in the reaction method of the invention is preferably (3) a step of causing pulsation on the basis of an interfacial tension difference between the fluid microchannel wall and the fluid.

The step of causing pulsation on the basis of an interfacial tension difference between the fluid microchannel wall and the fluid is a step of sending the fluid to be pulsated into the microchannel having a channel wall coated with a coating agent having predetermined properties. As the fluid to be pulsated is sent in the microchannel, an interfacial tension difference occurs at an interface where the fluid and the fluid microchannel wall comes into contact with each other. The fluid flowing within the microchannel can be thereby pulsated.

Here, the coating agent having predetermined properties can be used by being appropriately changed over according to the properties of the fluid to be pulsated. For example, in a case where the fluid to be pulsated is a hydrophobic fluid, it is possible to adopt a combination in which the coating agent provides a surface having a varying degree of hydrophilic property. Conversely, in a case where the fluid to be pulsated is a hydrophilic fluid, it is possible to adopt a combination in which the coating agent provides a surface having a varying degree of hydrophobic property.

The coating agent used in the invention is preferably a hydrophilic coating agent whose water repellent angle is 30 degrees or less with respect to a hydrophobic fluid to be pulsated, and is more preferably a hydrophilic coating agent whose water repellent angle is 20 degrees or less. The coating agent used in the invention is preferably a hydrophobic coating agent whose water repellent angle is greater than 70 degrees with respect to a hydrophilic fluid to be pulsated, and is more preferably a hydrophobic coating agent whose water repellent angle is greater than 90 degrees.

The pulsation step included in the reaction method of the invention is preferably a step of forming a phase difference of $2\pi/m$ in the pulsation of m kinds (m is an integer of 2 or more) of fluids forming a ring. Further, the m kinds of fluids are preferably sent so as to form a continuous or discontinuous ring. The m kinds of fluids are more preferably sent so as to be contiguous to each other along wall surfaces of the microchannel and form a continuous ring. However, if the step is such as to be able to form a phase difference of $2\pi/m$ in the m kinds of fluids, these fluids may be sent so as to form a discontinuous ring on the wall surfaces of the microchannel. Here, m is an integer of 2 or more, preferably 2 to 6, more preferably 4 to 6.

The m kinds of fluids may be liquids of the same kind.

In a case where these m kinds of fluids have sinusoidal waves of different frequencies (wavelengths), the m kinds of fluids produce surges in the microchannel.

Also, in a case where these m kinds of fluids have sinusoidal waves of the same frequency (wavelength), the effect of pulsation becomes large, and the diffusion effect based on impact energy becomes strong. For example, also in a case where pulsation of the same wavelength is imparted in opposite phases to upper and lower fluids 74a and 74b shown in FIG. 7, the reaction between incompatible fluids 72a and 72b sandwiched between these two pulsations is promoted by the interaction of pulsation of these two fluids.

Figure 7:
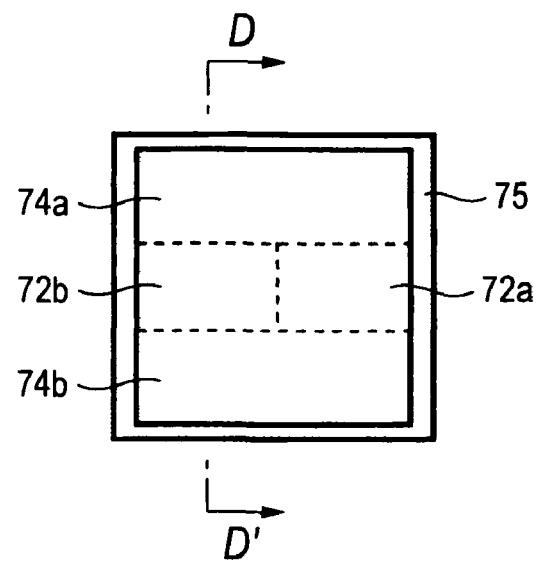
FIG. 7 is a diagram illustrating a cross section of the microreactor in which n=4, and m=2, and which is used as an exemplary embodiment of the invention.

As shown in FIG. 7, in a case where n is 4 and m is 2, for instance, two kinds of pulsating fluids with twofold different wavelengths are respectively sent in upper and lower layers of the microchannel, and two kinds of reactive fluids which are incompatible with the pulsating fluids are sent in an intermediate layer. The pulsating upper and lower fluids act on the two kinds of reactive fluids in the intermediate layer and impart surges generated by synthesizing these pulsations. By virtue of these surges, it is possible to promote the reaction between the two kinds of reactive fluids located in between.

Figure 9:
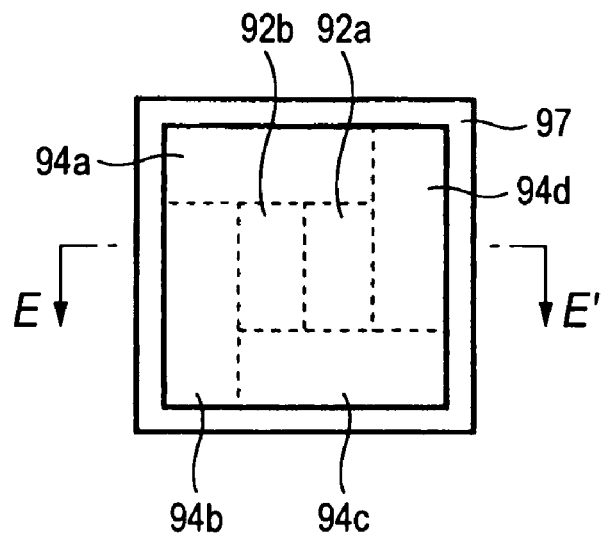
FIG. 9 is a plan view taken from the upper surface side of the microreactor in a case where n=6, and m=4, to send fluids along microchannel walls, and which is used as an exemplary embodiment of the invention.

As shown in FIG. 9, in a case where n is 6 and m is 4, four kinds of pulsating fluids (which may be four laminarly flowing liquids of the same kind) are sent so as to form a continuous ring. Although details will be described later, two kinds of fluids, which are contiguous to this ring and are incompatible with the fluids forming the ring, are sent inside the ring. These six kinds of fluids form a laminar flow. In addition, the four kinds of pulsating fluids are sent in the form of pulsation of sinusoidal waves with a phase difference of $\pi/2$ imparted thereto. The four kinds of pulsating fluids mutually strengthen their action within the microchannel. By so doing, the two kinds of fluids located inside the ring form spiral surges, and an interface where these two kinds of fluids adjoin each other is able to have a larger reaction surface area. It should be noted that, in this case, in a case where there is a difference in specific gravity between, on the one hand, the two kinds of reactive fluids and, on the other hand, the four kinds of surrounding incompatible liquids, the microchannel is preferably installed vertically.

Hereafter, with reference to the drawings, a more detailed description will be given of the microreactor in accordance with the invention.

FIG. 1 is a plan view taken from an upper surface side of the microreactor in which n=4, and which is used as an exemplary embodiment of the invention. Three kinds of fluids 12a, 12b, and 12c are respectively introduced into a microchannel 10 from fluid inlet ports 16a, 16b, and 16c and form a planar 3-channel confluent-type laminar flow. A fluid 14 is introduced from a fluid inlet port 16d and is fed to an upper stage of the microchannel 10 of the planar 3-channel confluent-type microchannel 10. These four kinds of fluids are contiguous to each other and form a laminar flow within the same microchannel. The fluid 14 is incompatible with at least one kind of fluid among the three kinds of fluids 12a, 12b, and 12c and is preferably incompatible with all the fluids of the fluids 12a, 12b, and 12c. In addition, pulsation is formed in the fluid 14. It should be noted that a microchannel wall 15 denotes a wall surface of the microchannel 10.

Figure 2:
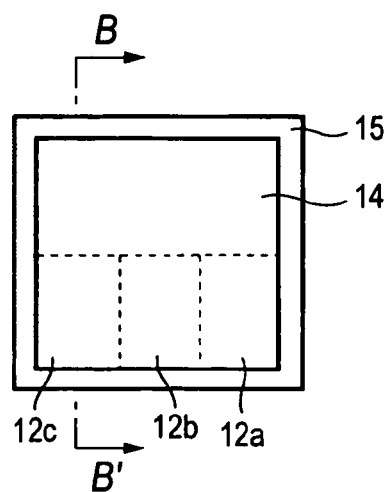
FIG. 2 is a cross-sectional view, taken along line A-A', of the microreactor shown in FIG. 1.

FIG. 2 is a cross-sectional view, taken along line A-A', of the microreactor shown in FIG. 1 referred to above. The aforementioned three kinds of fluids 12a, 12b, and 12c are mutually incompatible fluids, are contiguous to each other, and form a laminar flow. These three kinds of fluids 12a, 12b, and 12c are sent in a lower stage, while the fluid 14, which is incompatible with these three kinds of fluids, is sent in an upper stage. These four kinds of fluids are contiguous to each other and form a laminar flow within the same microchannel. Since the fluid 14 forms pulsation, an interface between the fluid 14 and the fluids 12a, 12b, and 12c oscillates. As the interface between the fluid 14 and the fluids 12a, 12b, and 12c oscillates, interfaces between the fluids 12a and 12b and between the fluids 12b and 12c also oscillate. As a result, the reaction in the microchannel 10 is promoted at the interfaces between the fluids 12a and 12b and between the fluids 12b and 12c.

Figure 3:
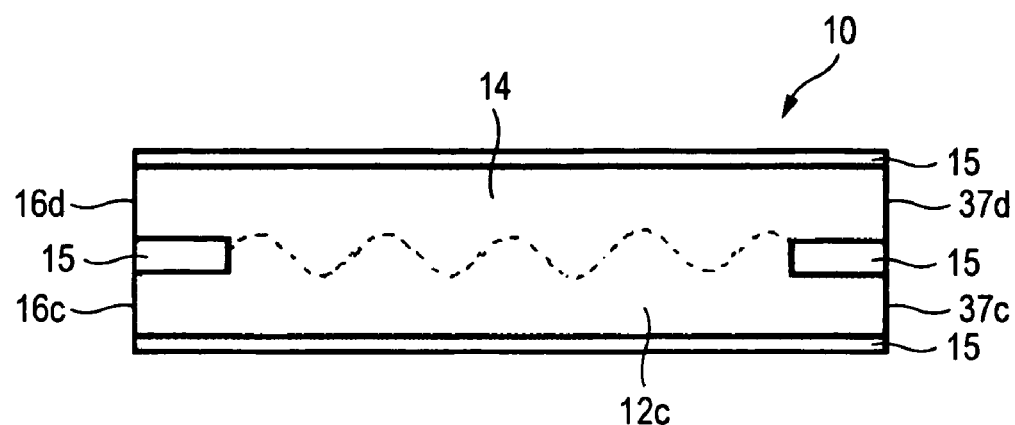
FIG. 3 is a cross-sectional view, taken along line B-B', of the microreactor shown in FIG. 2.

FIG. 3 is a cross-sectional view, taken along line B-B', of the microreactor shown in FIG. 2 and used as the exemplary embodiment of the invention. The fluids 12c and 14 are respectively introduced into the microchannel 10 from the fluid inlet ports 16c and 16d and form an adjacent laminar flow in the same microchannel. Since the fluid 14 forms pulsation, the interface between the fluid 14 and the fluid 12c oscillates. In addition, as the interface between the fluid 14 and the fluid 12c oscillates, the interface between the fluid 12b and the fluid 12c also oscillates. As a result, the reaction in the microchannel is promoted at the interface between the fluid 12b and the fluid 12c. The fluid 12c and the fluid 14 are respectively discharged to outside the microreactor from channel outlet ports 37c and 37d.

Figure 4:
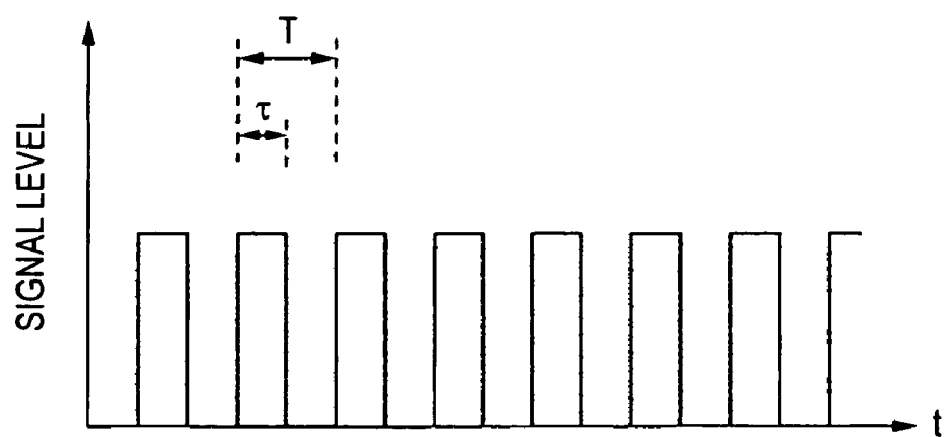
FIG. 4 is a diagram illustrating an example of control of an electromagnetic solenoid, which is used in the exemplary embodiment of the invention.

FIG. 4 is a diagram illustrating an example of control of an electromagnetic solenoid, which is used in the exemplary embodiment of the invention. By controlling the duty ratio ($\tau/T$) of the electromagnetic solenoid, it is possible to form within the microchannel pulsation which fluctuates periodically and continually. In addition, although not shown, it is also possible to artificially create an arbitrary pulsation waveform by making use of PWM in a known manner.

Figure 5:
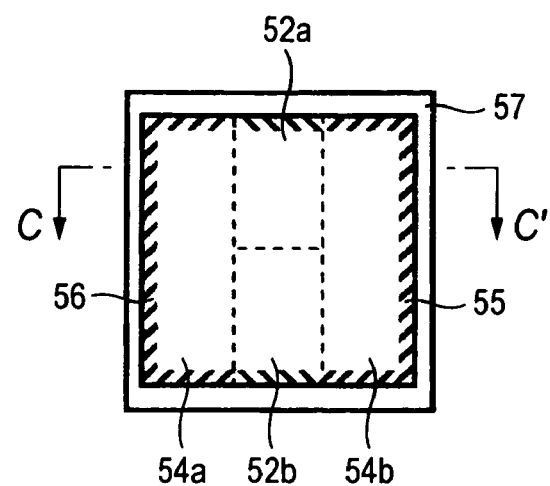
FIG. 5 is a cross-sectional view of the microreactor in a case where a hydrophilic coating agent is introduced on a microchannel wall, and which is used as an exemplary embodiment of the invention.

FIG. 5 is a cross-sectional view of the microreactor in a case where a hydrophilic coating agent is introduced on the microchannel wall, and which is used as an exemplary embodiment of the invention. Fluids 52a and 52b are mutually reactive and compatible fluids, are vertically contiguous to each other, and form a laminar flow. Fluids 54a and 54b which are incompatible with these two kinds of fluids 52a and 52b are sent on the left and right of the fluids 52a and 52b while forming pulsation. The fluids 54a and 54b are hydrophobic fluids. Of the microchannel wall surfaces, the microchannel wall surfaces where the fluids 54a and 54b flow are provided with hydrophilic coating agents 55 and 56 for causing the pulsation Meanwhile, the microchannel walls to which the fluids 53a and 52b are contiguous are not provided with these hydrophilic coatings and remain as hydrophobic coatings, and are provided with hydrophobic patterns with the same shape as that of a meandering channel formed in FIG. 6. Due to the formation of the hydrophilic and hydrophobic patterns on these wall surfaces, the fluids 52a and 52b contiguous to these microchannel walls are artificially set in the state of pulsation. As the interface between the fluids 54a and 54b also oscillates, the interface between the fluid 54a and each of the fluids 52a and 52b and the interface between the fluid 54b and each of the fluids 52a and 52b also oscillate. The reaction within the microchannel 10 is promoted at the interface between the fluids 52a and 52b which are artificially set in the state of pulsation. It should be noted that a microchannel wall 57 denotes a wall surface of the microchannel 10.

Figure 6:
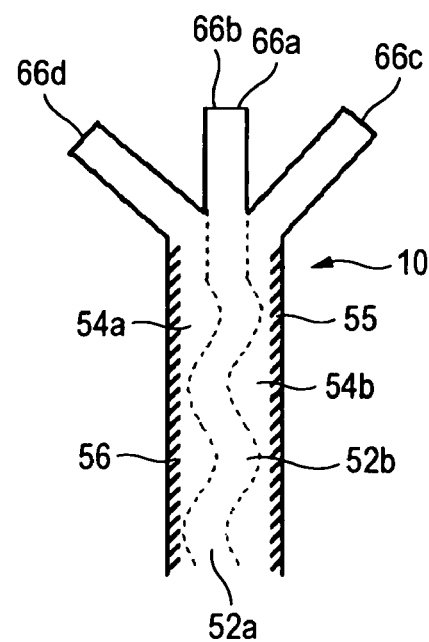
FIG. 6 is a cross-sectional view, taken along line C-C', of the microreactor shown in FIG. 5.

FIG. 6 is a cross-sectional view, taken along line C-C', of the microreactor shown in FIG. 5 referred to above. The two kinds of fluids 52a and 52b are respectively introduced into the microchannel 10 from fluid inlet ports 66a and 66b and form a laminar flow. The two kinds of fluids 54a and 54b introduced into the microchannel 10 from the fluid inlet ports 66c and 66d are contiguous to the fluids 52a and 52b, and are also contiguous to the microchannel wall surfaces provided with the hydrophilic coating agents 55 and 56. These four kinds of fluids form a laminar flow within the same microchannel. As the microchannel walls are provided with the hydrophilic coating agents 55 and 56 with the same shape as that of the meandering channel shown in FIG. 6, the interface between the fluids 54a and 54b, which are contiguous to the microchannel walls provided with the hydrophilic coatings, oscillates. As the interface between the fluids 54a and 54b oscillates, the interface between the reactive fluids 52a and 52b also oscillates. As a result, the reaction within the microchannel 10 is promoted at the interface between the fluids 52a and 52b which are artificially set in the state of pulsation.

FIG. 7 is a diagram illustrating a cross section of the microreactor in which n=4, and m=2, and which is used as an exemplary embodiment of the invention. In a case where two kinds of fluids 72a and 72 form a laminar flow, a fluid 74a is sent in an upper layer, and a fluid 74b is sent in a lower layer. The fluid 74a is contiguous to the fluids 72a and 72b and is in contact with microchannel walls. The fluid 74b is also contiguous to the fluids 72a and 72b and is in contact with the microchannel walls. These four kinds of fluids form a laminar flow within the same microchannel. The fluids 74a and 74b are sent while forming pulsations whose wavelengths are twofold different. The interface between the fluid 74a and each of the fluids 72a and 72b and the interface between the fluid 74b and each of the fluids 72a and 72b oscillate. As a result, the reaction within the microchannel 10 is promoted at the interface between the fluids 72a and 72b. In addition, as the wavelengths of the fluids 74a and 74b are twofold different, surges are produced in the microchannel 10, so that the reaction within the microchannel 10 is further promoted at the interface between the fluids 72a and 72b. It should be noted that a microchannel wall 75 denotes a wall surface of the microchannel 10.

Figure 8:
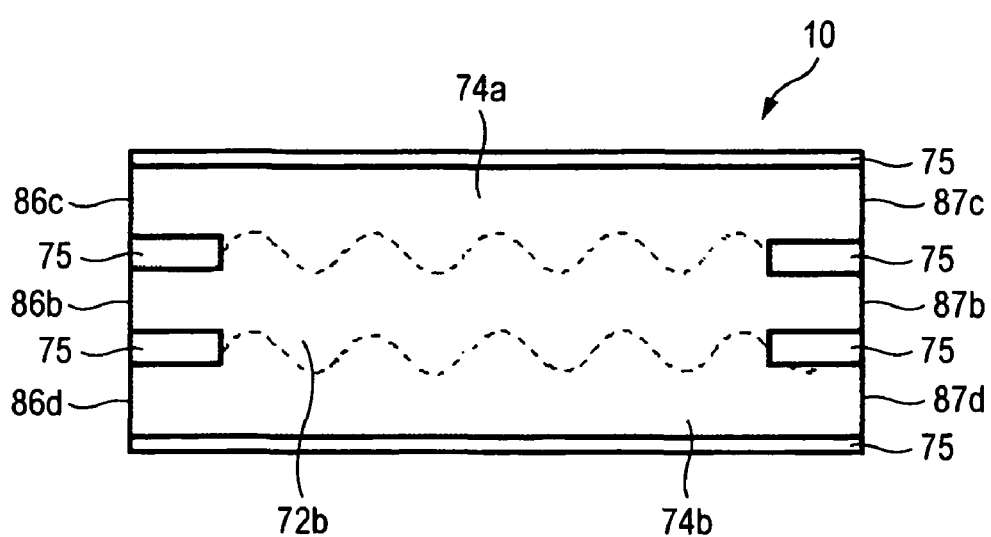
FIG. 8 is a cross-sectional view, taken along line D-D' of the microreactor shown in FIG. 7.

FIG. 8 is a cross-sectional view, taken along line D-D', of the microreactor shown in FIG. 7 and used as the exemplary embodiment of the invention. The three kinds of fluids 72b, 74a, and 74b are respectively introduced into the microchannel 10 from fluid inlet ports 86b, 86c, and 86d, are contiguous to each other, and form a laminar flow within the same microchannel. Since pulsations whose wavelengths are twofold different are formed in the fluids 74a an 74b, the interface between the fluids 74a and 72a oscillates, and the interface between the fluid 74b and the fluid 72a oscillates. As the interface between the fluid 72a and the fluid 74a or the fluid 74b oscillates, the interface between the fluid 72a and the fluid 72b also oscillates. As a result, the reaction within the microchannel 10 is promoted at the interface between the fluid 72a and the fluid 72b. The fluids 72b, 74a, and 74b are respectively discharge to outside the microreactor from fluid outlet ports 87b, 87c, and 87d.

FIG. 9 is a plan view taken from the upper surface side of the microreactor in a case where n=6, and m=4, to send fluids along microchannel walls, and which is used as an exemplary embodiment of the invention. The fluids are sent in a perpendicular direction to the plane of the drawing. In a case where two kinds of fluids 92a and 92b form a laminar flow, fluids 94a, 94b, 94c, and 94d are sent so as to form a ring. The fluids 94a, 94b, 94c, and 94d are contiguous to the fluids 92a and 92b and are in contact with the microchannel walls. These six kinds of fluids form a laminar flow within the same microchannel. Since the fluids 94a, 94b, 94c, and 94d are pulsated, the interfaces between the fluid 94a and each of the fluids 92a and 92b, between the fluid 94b and the fluid 92b, between the fluid 94c and each of the fluids 92a and 92b, and between the fluid 94d and the fluid 92b oscillate. As a result, the reaction within the microchannel 10 is promoted at the interface between the fluids 92a and 92b. In addition, as phases of the fluids 94a, 94b, 94c, and 94d are respectively set to 0, π/2, π, and 3/2π, the fluids 94a, 94b, 94c, and 94d interfere with each other within the same microchannel. Consequently, the fluids 92a and 92b form spiral surges, and the reaction within the microchannel 10 is further promoted at the interface between the fluids 92a and 92b. It should be noted that a microchannel wall 97 denotes a wall surface of the microchannel 10.

Figure 10:
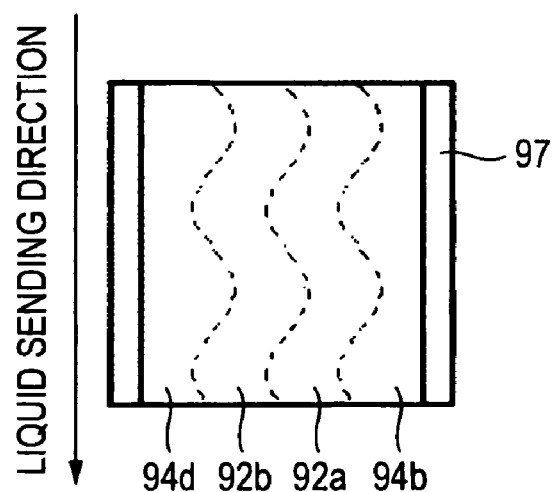
FIG. 10 is a cross-sectional view, taken along line E-', of the microreactor shown in FIG. 9.

FIG. 10 is a cross-sectional view, taken along line E-E', of the microreactor shown in FIG. 9 and used as the exemplary embodiment of the invention. The fluids 94a, 94b, 94c, and 94d are contiguous to each other and form a laminar flow in the longitudinal direction of the plane of the drawing. Since the fluids 94b and 94d are pulsated, the interfaces between the fluid 94b and each of the fluids 92a and 92b and between the fluid 94b and each of the fluids 92a and 92b oscillate. As a result, the reaction within the microchannel 10 is promoted at the interface between the fluids 92a and 92b. In addition, as phases of the fluids 94a, 94b, 94c, and 94d are respectively set to 0, π/2, π, and 3/2π, the fluids 94a, 94b, 94c, and 94d interfere with each other within the same microchannel. Consequently, the fluids 92a and 92b form spiral surges, and the reaction within the microchannel 10 is further promoted at the interface between the fluids 92a and 92b.

Figure 11:
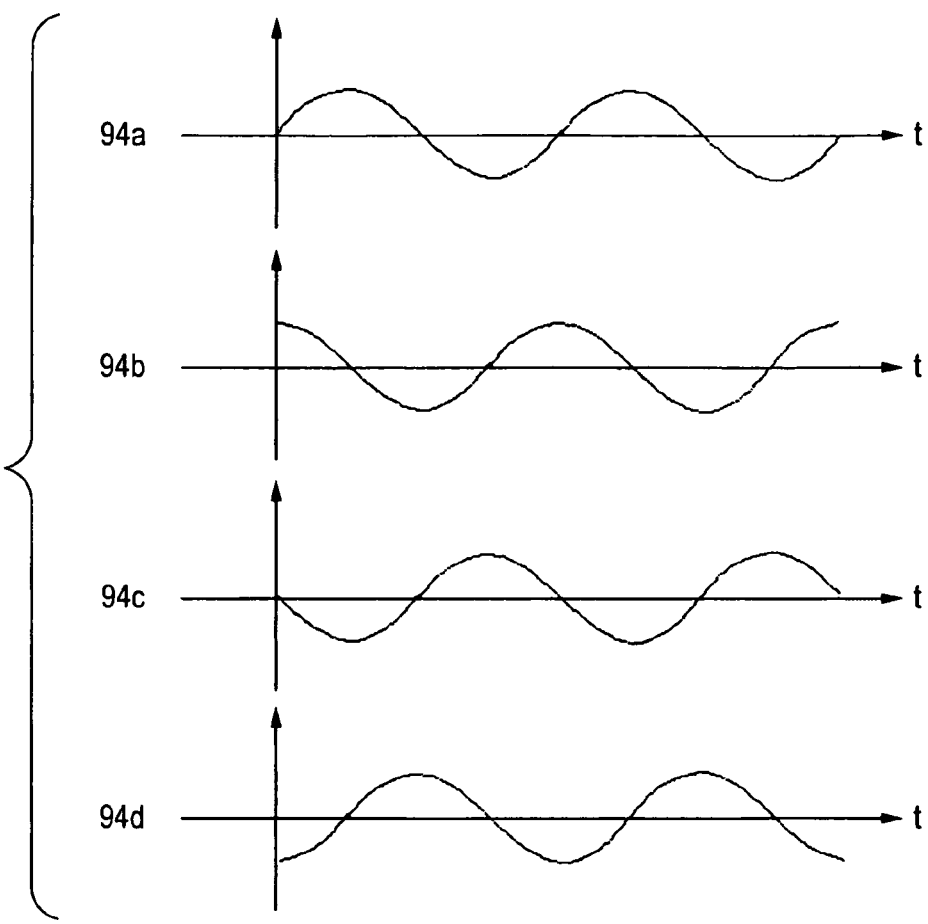
FIG. 11 is a diagram illustrating an example of phases per hour of fluids $94a$, $94b$, $94c$, and $94d$ in a case where n=6, and m=4, and the fluids are provided with phase differences of $\pi/2$, and which is used as the exemplary embodiment of the invention.

FIG. 11 is a diagram illustrating an example of phases per hour of the fluids 94a, 94b, 94c, and 94d in a case where n=6, and m=4, and the fluids are provided with phase differences of π/2, and which is used as the exemplary embodiment of the invention.

Hereafter, a description will be given of the method of manufacturing a microreactor. The microreactor in accordance with the invention can be fabricated by any known method. Also, the microreactor in accordance with the invention can also be fabricated on a solid substrate by a micro-machining technique.

As examples of materials which can be used as the solid substrate, it is possible to cite a metal, silicon, Teflon (registered tradename), glass, a ceramic, aplastic, and the like. Among others, a metal, silicon, Teflon (registered tradename), glass, and a ceramic are preferable from the standpoint of heat resistance, pressure resistance, solvent resistance, and optical transparency, and glass and polydimethylsiloxane (PDMS) resin are particularly preferable.

As the micro-machining techniques for fabricating the microchannel, it is possible to cite the methods described in, for example, "Microreactors, Epoch-making Technology for Synthesis" (edited by Jun-ichi Yoshida and published by CMC Publishing Co., Ltd., 2003) and "Fine Processing Technology, Application Volume—Application to Photonics, Electronics and Mechatronics—" (edited by the Meeting Committee of the Society of Polymer Science, Japan, and published by NTS Inc., 2003).

To cite typical methods, the micro-machining techniques include, for instance, the LIGA (lithographic galvanoforming abforming) technique using X-ray lithography, high-aspect-ratio photolithography using EPON SU-8 (tradename), micro-electro-discharge machining (μ-EDM), high-aspect-ratio machining of silicon by deep reactive ion etching (RIE), hot embossing, stereolithography, laser machining, ion beam machining, and mechanical micro-cutting using micro-tools made of hard materials such as diamond. Any of these techniques can either be used by itself or in a combination of two or more. More preferable ones among these micro-machining techniques are the LIGA (lithographic galvanoforming abforming) technique using X-ray lithography, high-aspect-ratio photolithography using EPON SU-8, micro-electro-discharge machining (μ-EDM), and mechanical micro-cutting.

The microchannels used in the invention can also be fabricated by pouring and solidifying a resin in a pattern, as a mold, formed on a silicon wafer by using a photoresist (molding process). As the molding process, it is possible to use a silicone resin which is typified by PDMS or its derivative.

As the method of introducing a hydrophilic or hydrophobic coating material onto the microchannel walls, it is possible to cite a vapor deposition polymerization process. The case of forming a thin film by the vapor deposition polymerization process will be described by citing polyimide as an example. In a vacuum tank of $10^3$ Pa, pyromellitic anhydride and 4-4'-diamino-diphenyl ether are sublimated by heating at 180° C. and 160° C., respectively. After a sublimated monomer has reached the microchannel wall surfaces, an amino group and a carbonyl group react with each other to form a polyamic acid film. Subsequently, the polyamic acid film is heated at 200 to 300° C. to undergo dehydration reaction, thereby forming a polyimide film.

In the above-described vapor deposition polymerization process, various kinds of thin films of polyimide are formed by the combination of monomers. In addition, although the formation of thin films consisting of polyamide, polyurea, or polyurethane, in addition to polymide, is also possible by changing the functional group, polyimide is preferable in the invention.

As the coating material, it is possible to cite, in addition to polyimide, known materials such as low molecular weight fluorine compound, fluoroethylene resin, and silica. As these materials are vapor-deposited or applied to the wall surfaces of the microchannel as the coating material, thereby making it possible to form a hydrophobic coating agent. Further, after the vapor deposition or application, if the coating material is subjected to oxygen plasma treatment to introduce a hydroxyl group onto the coating material surface, thereby making it possible to form a hydrophilic coating agent. Still alternatively, after polyimide is applied as a coating material, if the coating material is subjected to carbon fluoride plasma treatment, thereby making it possible to treat the coating material surface into a hydrophobic surface.

In manufacturing the microreactor device in accordance with this exemplary embodiment, it is possible to use a bonding technique. Normal bonding techniques are classified into solid phase bonding and liquid phase bonding. As bonding methods which are generally employed, pressure bonding and diffusion bonding can be cited as typical methods of solid phase bonding, while welding, soldering, adhesive bonding, and the like are typical methods of liquid phase bonding.

Furthermore, the bonding method should preferably be highly accurate in such a manner as to maintain dimensional accuracy without changing the properties of the material due to application of high-temperature heat thereto and without involving the destruction of microstructures, such as the flow channel, due to deformation thereof. As technologies for achieving such a bonding method, it is possible to cite silicon direct bonding, anodic bonding, surface activation bonding, direct bonding using a hydrogen bond, bonding using an HF aqueous solution, Au—Si eutectic bonding, and void-free bonding.

EXAMPLES

Figure 12:
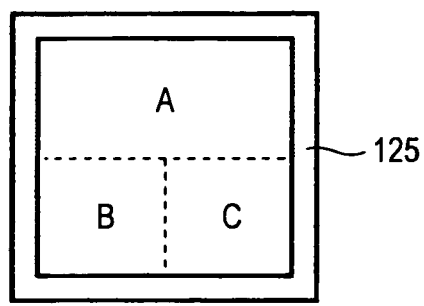
FIG. 12 is a cross-sectional view of the microreactor used in Examples 1 to 3 of the invention.

Hereafter, a more detailed description will be given of the invention on the basis of examples. The invention is not limited to these examples. It should be noted that, in Examples 1 to 3, as shown in FIG. 12, three liquids A, B, and C were sent along microchannel walls 125, and the reaction between the liquids A and B, which were mutually compatible, was promoted by the pulsation of the liquid C which was incompatible with the liquids A and B. In Examples 4 and 5, four fluids shown in FIG. 5 were used. In Example 6, six fluids shown in FIG. 13 were used.

Example 1

Synthesis of Organic Pigment

As the fluid B, a solution was used in which 37.9 g (0.1 mol) of the following compound (i) was suspended in 300 ml of 1,2-dichlorobenzene at 80° C.

As the fluid C, a solution was used in which 8.9 g (0.05 mol) of the following compound (ii) was suspended in 300 ml of 1,2-dichlorobenzene at 80° C.

As the fluid A, ethylene glycol was heated to 170° C. to be provided with the effect of temperature control, was pulsated, and was sent at an average rate of 12 ml/min (amplitude: +6 ml/min).

As a result, it was possible to obtain a suspension of a pigment (iii) of the following compound continuously for 24 hours. In addition, when the suspension was analyzed, the purity of the product was 90% or more.

It should be noted that, a means for causing pulsation was provided by controlling the duty ratio of an electromagnetic solenoid of a syringe pump.

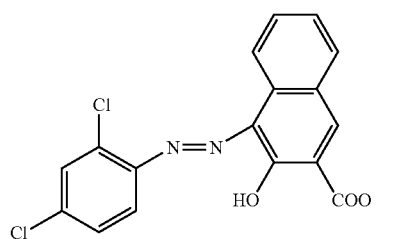

(i)

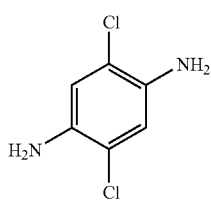

(ii)

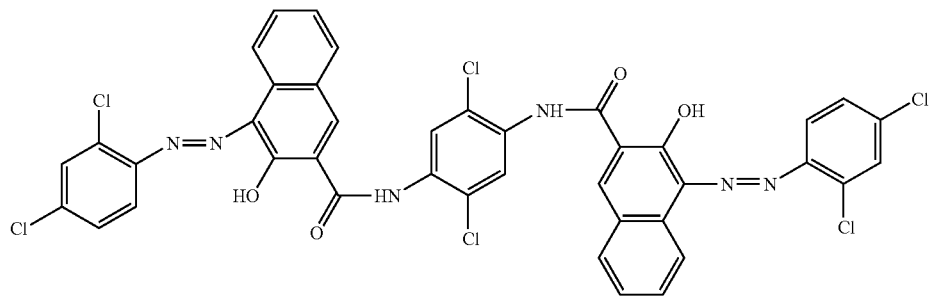

(iii)

Example 2

As the fluid B, a solution was used in which 37.9 g (0.1 mol) of the above-described compound (i) was suspended in 300 ml of 1,2-dichlorobenzene at 80° C.

As the fluid C, a solution was used in which 8.9 g (0.05 mol) of the above-described compound (ii) was suspended in 300 ml of 1,2-dichlorobenzene at 80° C.

As the fluid A, ethylene glycol was heated to 170° C. to be provided with the effect of temperature control, was pulsated, and was sent at an average rate of 12 ml/min (amplitude: ±6 ml/min).

As a result, it was possible to obtain a suspension of the pigment (iii) of the above-described compound continuously for 24 hours. In addition, when the suspension was analyzed, the purity of the product was 90% or more.

It should be noted that, as for the means for causing pulsation, the frequency of a vibrator was set to 10 Hz.

Example 3

Example 3 was carried out in the same way as in Example 2 except that the frequency of the vibrator was set to 50 Hz, i.e., the same as a commercial power supply. When the suspension was analyzed, the purity of the product was 85% or more.

Example 4

The four fluids shown in FIG. 5 were used.

As the fluid 52a, a solution was used in which 37.9 g (0.1 mol) of the above-described compound (i) was suspended in 300 ml of 1,2-dichlorobenzene at 80° C.

As the fluid 52b, a solution was used in which 8.9 g (0.05 mol) of the above-described compound (ii) was suspended in 300 ml of 1,2-dichlorobenzene at 80° C.

As the fluids 54a and 54b, ethylene glycol was heated to 170° C. to be provided with the effect of temperature control, and was sent.

It should be noted that the channel walls used were such that, as the channel walls 55 and 56 of the microchannel, polyimide thin films were subjected to fluorine plasma treatment to set the water repellent angle to 82° and, as the channel wall of the fluid 52a, silica was vapor-deposited on the channel wall to set the water repellent angle to 1.0°.

As a result, it was possible to obtain a suspension of the pigment (iii) of the above-described compound continuously for 24 hours. In addition, when the suspension was analyzed, the purity of the product was 90% or more.

Example 5

Figure 13:
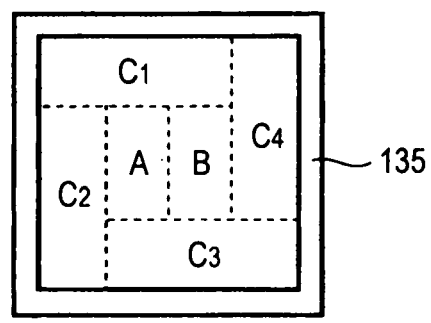
FIG. 13 is a cross-sectional view of the microreactor used in Example 5 of the invention.

Six liquids A, B, and $C_1$ to $C_4$ shown in FIG. 13 were used, and the liquids $C_1$ to $C_4$ were pulsated to perform the reaction between the liquids A and B. It should be noted that the microchannel was provided in a vertical direction to send the liquids. The liquids $C_1$ to $C_4$ were sent so as to be in contact with microchannel walls 135, and were sent by setting the phase differences of the liquids $C_1$ to $C_4$ to $\pi/2$, respectively. The means for causing pulsation was provided by controlling the duty ratio of an electromagnetic solenoid of a syringe pump.

As the fluids A and B, those which were identical to the solutions described in Example 1 were used.

As the fluids $C_1$ to $C_4$, ethylene glycol was heated to 170° C. to be provided with the effect of temperature control, and was sent.

As a result, it was possible to obtain a suspension of the pigment (iii) of the above-described compound continuously for 24 hours. In addition, when the suspension was analyzed, the purity of the product was 90% or more.

Example 6

By using the microreactor having four channels in a cross section as shown in FIG. 5, chemical reaction of two kinds of solutions flowing in the middle was carried out.

A reaction system in which the length of a mixing channel was a fixed length of 50 cm was used. As one aqueous solution A, a mixed aqueous solution of 0.016 mol/L of potassium iodide, 0.0032 mol/L of potassium trioxide, and 1.33 mol/L of sodium acetate was sent. As the other aqueous solution B, 0.138 mol/L of dilute hydrochloric acid was sent. The flow rates were both varied in the range of 1 to 20 ml/min such that the quantities of the liquids sent became always equal for the liquids A and B.

At this juncture, as the liquids C and D located on both sides of the liquids A and B which were sent in upper and lower layers, white gasoline was sent with pulsation imparted thereto, and its average flow rate was set to be equal to that of the liquids A and B. The pulsation frequency was changed to 0, 0.01, 1, 2, and 5 Hz. However, the input power was fixed at 1 W. The progress of mixing of the liquids A and B was confirmed by an UV spectrophotometer (wavelength: 350 nm, transmitted). In this experiment, the higher the mixing efficiency, the greater the UV absorbance.

Figure 14:
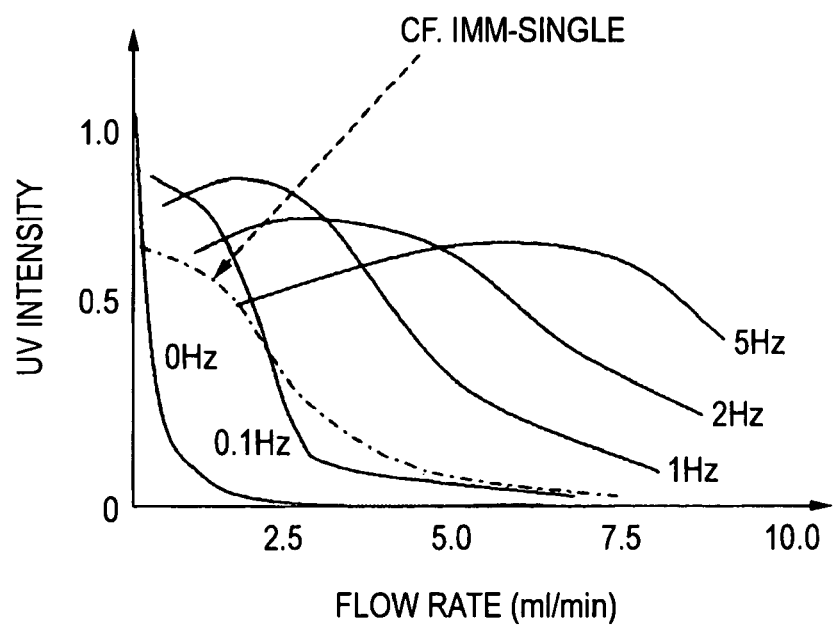
FIG. 14 is a diagram illustrating the results of the experiment of Example 6.

The obtained results are shown in FIG. 14. As for the UV absorbance, if the flow rate is increased, the residence time becomes short, so that the fluids are difficult to mix; however, it was found that by promoting mixing by increasing the frequency, it becomes possible to obtain approximately equivalent performance to that of a case where the flow rate is slow. By application of pulsation, the flow rate can be made fast, so that an advantage of enabling mass production was obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reaction method using a microreactor, comprising:
   forming, in a microchannel, an at least two-layered laminar flow in n kinds (n is an integer of 3 or more) of a fluid 1, a fluid 2, ..., and a fluid n at least two kinds of which are mutually incompatible; and
   pulsating at least one kind of the fluid, wherein a velocity of flow of the at least one kind of the fluid among the n kinds of fluids is pulsated in a longitudinal direction of the microchannel, and the n kinds of fluids are reacted through molecular diffusion in an interface region of the at least two-layered laminar flow,
   wherein at least two of the n kinds of fluids are contiguous to a wall of the microchannel.

2. The reaction method using a microreactor according to claim 1, wherein the n is 3 to 10.

3. The reaction method using a microreactor according to claim 1, wherein the n is 3 to 8.

4. The reaction method using a microreactor according to claim 1,
wherein a combination of the two kinds of mutually incompatible fluids is a combination selected from water and white gasoline, water and benzene, and water and toluene, and 1,2-dichlorobenzene and silicone oil.

5. The reaction method using a microreactor according to claim 1, wherein the fluids include, as a hydrophilic fluid, one selected from ethanol, acetic acid, and ethylene glycol.

6. The reaction method using a microreactor according to claim 1,
wherein the fluids include, as a hydrophobic fluid, one selected from white gasoline, benzene, toluene, nitrobenzene, aniline, methyl nitrate, and carbon disulfide.

7. The reaction method using a microreactor according to claim 1,
wherein, of the n kinds of fluids, at least two kinds of fluids are mutually compatible.

8. The reaction method using a microreactor according to claim 1,
wherein a frequency of pulsation is an ultra low frequency.

9. The reaction method using a microreactor according to claim 1,
wherein a frequency of pulsation is 1 Hz or more and less than 1 kHz.

10. The reaction method using a microreactor according to claim 1,
wherein the pulsating is pulsating a flow rate of said at least one kind of the fluids which is supplied by a syringe pump.

11. The reaction method using a microreactor according to claim 1,
wherein the pulsating is pulsating; by a vibrator, an elastic tube in which said at least one kind of the fluids flows, so as to send said at least one kind of the fluids in a pulsated state to the microchannel.

12. The reaction method using a microreactor according to claim 1,
wherein the pulsating is causing pulsation based on an interfacial tension difference between the microchannel wall and said at least one kind of the fluids.

13. The reaction method using a microreactor according to claim 1,
wherein the pulsating is forming a phase difference of $2\pi/m$ in pulsation of m kinds (m is an integer of 2 or more) of fluids flowing alongside a wall of the microchannel.

14. The reaction method using a microreactor according to claim 13,
wherein the m is 2 to 6.

15. The reaction method using a microreactor according to claim 13,
wherein the n is 4 to 6.

16. The reaction method using a microreactor according to claim 12, wherein a hydrophilic coating agent is provided on the wall of the microchannel.

* * * * *